United States Patent
Ji et al.

(10) Patent No.: US 8,073,395 B2
(45) Date of Patent: Dec. 6, 2011

(54) CHANNEL SENSING BASED ON SELF-SIGNAL SUPPRESSION

(75) Inventors: Baowei Ji, Richardson, TX (US); Yinong Ding, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1393 days.

(21) Appl. No.: 11/638,301

(22) Filed: Dec. 12, 2006

(65) Prior Publication Data

US 2007/0226576 A1  Sep. 27, 2007

Related U.S. Application Data

(60) Provisional application No. 60/780,026, filed on Mar. 7, 2006, provisional application No. 60/790,211, filed on Apr. 7, 2006.

(51) Int. Cl.
  *H04B 17/00* (2006.01)
(52) U.S. Cl. ............... 455/67.13; 455/67.11; 455/63.1
(58) Field of Classification Search ............ 455/63.3, 455/63.1, 67.11, 67.13, 41.2
  See application file for complete search history.

(56) References Cited

U.S. PATENT DOCUMENTS

| | | | | |
|---|---|---|---|---|
| 4,145,656 A | * | 3/1979 | Merryman et al. | 455/77 |
| 4,162,376 A | * | 7/1979 | Hirschmann et al. | 370/268 |
| 5,511,010 A | * | 4/1996 | Burns | 702/108 |
| 5,680,130 A | * | 10/1997 | Tsutsui et al. | 341/87 |
| 6,771,723 B1 | * | 8/2004 | Davis et al. | 375/350 |
| 7,245,877 B2 | * | 7/2007 | Liu et al. | 455/62 |
| 7,424,268 B2 | * | 9/2008 | Diener et al. | 455/62 |
| 7,554,956 B2 | * | 6/2009 | Kang et al. | 370/335 |
| 7,609,793 B2 | * | 10/2009 | Tomioka et al. | 375/347 |
| 7,623,467 B1 | * | 11/2009 | Sun et al. | 370/252 |
| 7,801,490 B1 | * | 9/2010 | Scherzer | 455/67.13 |
| 7,940,794 B2 | * | 5/2011 | Zhang et al. | 370/468 |
| 2003/0001586 A1 | * | 1/2003 | Warke | 324/527 |
| 2003/0179734 A1 | * | 9/2003 | Tsutsumi et al. | 370/338 |
| 2004/0224725 A1 | * | 11/2004 | Kim et al. | 455/561 |
| 2006/0030318 A1 | * | 2/2006 | Moore et al. | 455/434 |
| 2006/0153142 A1 | * | 7/2006 | Kang et al. | 370/335 |
| 2006/0171445 A1 | * | 8/2006 | Batra et al. | 375/130 |
| 2006/0256884 A1 | * | 11/2006 | Tomioka et al. | 375/260 |
| 2007/0032254 A1 | * | 2/2007 | Chen | 455/509 |
| 2007/0086396 A1 | * | 4/2007 | Alapuranen | 370/338 |
| 2008/0192810 A1 | * | 8/2008 | Razzell et al. | 375/150 |

* cited by examiner

Primary Examiner — Lewis West

(57) ABSTRACT

A method and apparatus for channel sensing in a wireless communication device is provided. A self-signal intentionally transmitted to a first wireless device by another wireless communication device is detected in a signal received by the first wireless device. An original self-signal transmitted by the second wireless device is reconstructed from the detected self-signal. The reconstructed self-signal is then suppressed in the received signal and channel sensing is performed on the remaining signal. If the self-signal cannot be detected and verified in the received signal, the second wireless device may be requested to retransmit a modified self-signal and a predetermined number of attempts made to detect and verify the self-signal. Results of channel estimation performed on the received signal may be used in reconstructing the original self-signal. The channel estimation may include information from a plurality of frames in the received signal.

30 Claims, 3 Drawing Sheets

CHANNEL SENSING BASED ON SELF-SIGNAL SUPPRESSION

CROSS-REFERENCE TO RELATED APPLICATIONS AND CLAIM OF PRIORITY

This application is related to U.S. Provisional Patent No. 60/780,026, filed Mar. 7, 2006, entitled "Channel Sensing Based on Successive Interference Cancellation", and to U.S. Provisional Patent No. 60/790,211, filed Apr. 7, 2006, entitled "Channel Sensing Based on Self-Signal Suppression (SSS)". Provisional Patent Nos. 60/780,026 and 60/790,211 are assigned to the assignee of this application and are incorporated by reference as if fully set forth herein. This application claims priority under 35 U.S.C. §119(e) to Provisional Patent Nos. 60/780,026 and 60/790,211.

TECHNICAL FIELD OF THE INVENTION

The present application relates generally to wireless communication devices and, more specifically, to wireless communication devices that perform channel sensing.

BACKGROUND OF THE INVENTION

Use of the radio frequency (RF) spectrum is regulated by governmental entities in each country. Typically, a fixed band of the spectrum is allocated to one or more types of primary users. Certain bands of the spectrum may be overloaded, such as cellular network bands, while other bands may be underused, such as television and radio broadcast bands. For example, a town may have only a few television stations or a radio station may cease broadcasting at a certain time of day. Previously, non-licensed users were prevented from using such underused bands of the spectrum.

More recently, regulatory agencies have opened up some bands of the RF spectrum to secondary users, provided such secondary users avoid interference with primary users. Interference is avoided by deferring to primary users when such users are operating and on the portions of a band in which they are operating. Such opportunistic use of under-utilized RF spectrum for wireless communication is often referred to as cognitive radio.

In order to avoid interference with primary users of a band, a secondary user may perform channel sensing on one or more channels of the band to determine whether a primary user is currently using the channels. If such use is sensed, the secondary user may attempt to use other channels or delay its use of the first channels until such use will not interfere. A secondary user may already be using a channel when a cognitive radio attempts to use it or a primary user may begin using a channel while the secondary user is using it. In either case, the secondary user is required to sense the primary user's activity and avoid use of the channel.

Where no use is currently being made of a channel by a collection of intercommunicating cognitive radios (a cell), the radios of the cell may simply receive signals on the channel and use one of several known techniques for determining whether the channel is already in use. Where the cell is already using a channel, the radios of the cell must periodically cease transmitting on the channel to sense use of the channel by a primary user. Such a channel sensing technique may be referred to as quiet period channel sensing.

Alternatively, the radios of a cell may employ channel-hopping: using a subset of the available channels in a band and, at regular intervals, hopping to a different subset, after checking that the new subset is not already in use. In this way, the secondary users will avoid hopping onto channels already in use by primary user and within a predetermined period, hop off of channels that a primary user has begun using. Such hopping techniques may also be used among subcarriers within a single channel.

All these techniques for channel sensing result in the cognitive radios of a cell using less than the full bandwidth available in an RF band. There is therefore a need for a more efficient technique of channel sensing. More particularly, there is a need for channel sensing while continuing to use channels and subcarriers of an RF band.

SUMMARY OF THE INVENTION

The present disclosure provides a technique for performing channel sensing in a wireless communication device after removing, or suppressing, from a received signal a self-signal intentionally transmitted to the device.

In one embodiment, a method for channel sensing for use in a wireless communication device is provided. The method includes receiving a signal and detecting in the received signal a self-signal transmitted to the wireless device from a second wireless device. The method also includes reconstructing from the detected self-signal an original self-signal transmitted by the second wireless device. The method further includes removing the reconstructed original self-signal from the received signal and performing channel sensing on the remaining signal.

In another embodiment, a wireless communication device, including a channel sensing apparatus, is provided. The channel sensing apparatus is capable of receiving a signal. The apparatus is also capable of detecting a self-signal in the received signal, the self-signal being transmitted to the wireless device from a second wireless communication device. The apparatus is further capable of reconstructing from the detected self-signal an original self-signal transmitted by the second wireless device and removing the reconstructed original self-signal from the received signal to generate a remaining signal. The apparatus is also capable of performing channel sensing on the remaining signal.

In yet another embodiment, a channel sensing apparatus for use in a wireless communication device is provided. The apparatus is capable of receiving a signal and detecting in the signal a self-signal transmitted to the wireless device by a second wireless communication device. The apparatus is also capable of reconstructing from the detected self-signal an original self-signal transmitted by the second wireless device. The apparatus is further capable of removing the reconstructed original self-signal from the received signal and performing channel sensing on the remaining signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
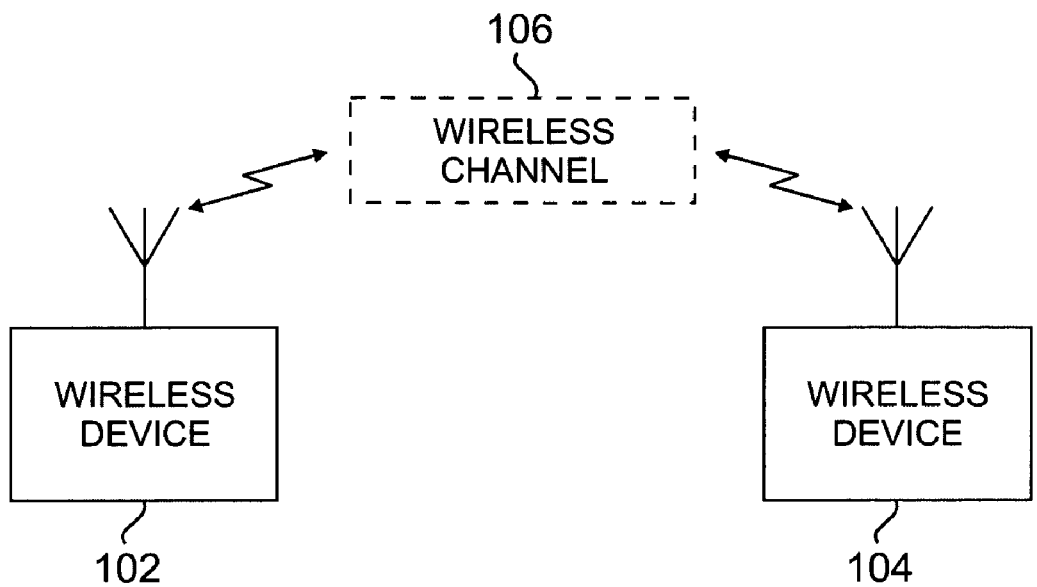
FIG. 1 illustrates two wireless devices communicating via a wireless channel.

FIG. 1 illustrates two wireless communication devices 102 and 104 communicating via a wireless channel 106. The wireless channel 106 may have certain characteristic effects on the radio signals transmitted between the wireless devices 102 and 104. For example, the strength of the signals may be attenuated by an amount proportional to the distance separating the wireless devices 102 and 104. Also, intervening structures may further attenuate the signal strength by blocking line-of-sight transmission. Furthermore, radio signals transmitted by one wireless device may be reflected from one or more surfaces during travel, with the reflected signals constructively or destructively recombining with the direct signal at the receiving wireless device to create multipath fading.

A process of channel estimation may determine a quality of a wireless channel, or sub-channels, between two wireless devices. When transmitting, a wireless device may use the results of channel estimation to select transmission parameters, such as transmit power, bit rate, modulation and coding scheme, etc. When receiving, a wireless device may use the results of channel estimation to modify a received signal to eliminate some effects of the wireless channel on the signal.

Figure 2:
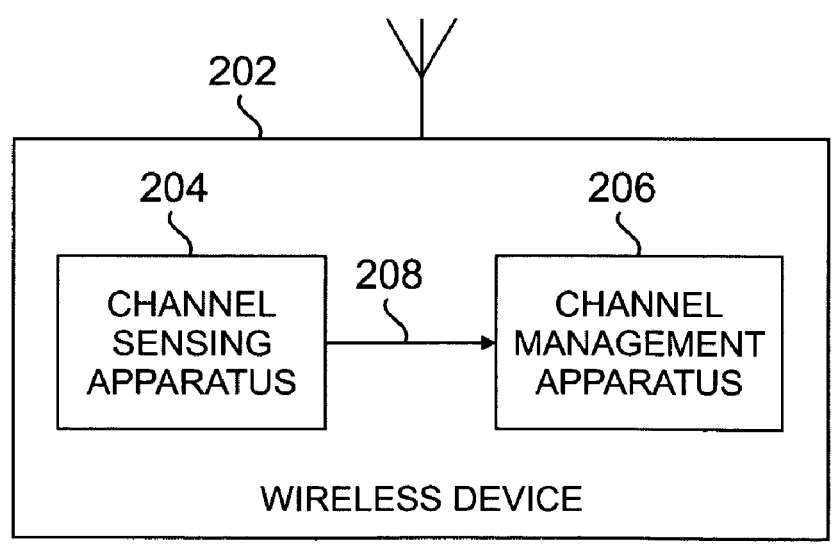
FIG. 2 depicts a wireless device according to the present disclosure.

FIG. 2 depicts a wireless communication device 202 according to the present disclosure. The wireless device 202 may include a channel sensing apparatus 204 that attempts to determine whether there are already other users of a channel. The channel sensing apparatus may signal the presence or absence of other users on one or more channels to a channel management apparatus 206 via a communication link 208. If other users are sensed on one or more channels, the channel management apparatus 206 may determine a channel usage plan that minimizes interference caused to the other users by the wireless communication device 202 and other wireless devices in its cell.

Figure 3:
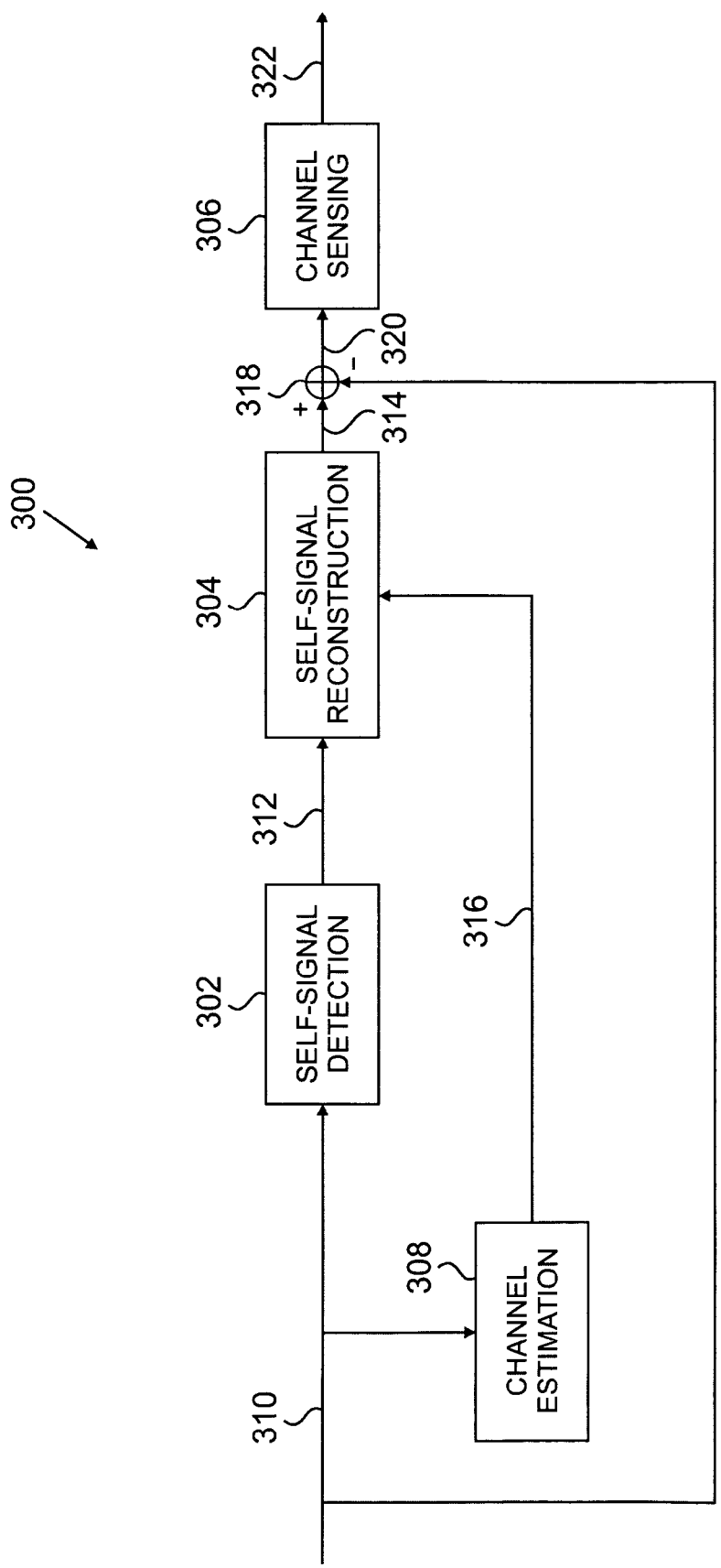
FIG. 3 shows a channel sensing apparatus in accordance with the present disclosure.

FIG. 3 shows a channel sensing apparatus 300 in accordance with the present disclosure for use in a wireless communication device. A signal may be received on a link 310. A self-signal detection apparatus 302 may attempt to detect in the received signal a self-signal, that is, a signal intentionally transmitted to the wireless device.

The self-signal detection apparatus 302 may also attempt to verify the detected self-signal with a CRC check or other data integrity verification method. Should verification of the self-signal fail, the wireless device receiving the signal may request that the wireless device retransmit the signal with error-correction codes attached or at a higher power, to improve the probability of verifiable detection of the self-signal. Should detection and verification of the self-signal continue to fail after repeated attempts, quiet period channel sensing or other channel sensing techniques may be used instead.

The self-signal detection apparatus 302 may send the detected self-signal on a link 312 to a self-signal reconstruction apparatus 304. The self-signal reconstruction apparatus 304 may also receive information on a link 316 about characteristics of the wireless channel from a channel estimation apparatus 308. With this information, the self-signal reconstruction apparatus 304 may compensate for the effects of the wireless channel and produce a signal on a link 314 that is closer to the original self-signal transmitted to the wireless device.

The channel estimation apparatus 308 may operate on preambles or other portions of the received signal that are invariant or predictable. In this way, the effects of the wireless channel may be determined. The channel estimation apparatus 308 may further accumulate and average several preambles or channel estimation results to obtain a better estimation of the characteristics of the channel.

A mixer 318 may remove the reconstructed original self-signal from the signal received on the link 310 to generate a remaining signal on a link 320. The self-signal has thus been cancelled, or suppressed, in the received signal to generate the remaining signal on the link 320. The remaining signal may include a residue of the self-signal and other signals, such as interference signals from other sources and signals from primary or other users of the channel. A channel sensing apparatus 306 may perform channel sensing on the remaining signal on the link 320, in order to determine whether there are other users of the channel. The channel sensing apparatus 306 may signal the results of its determination on a link 322.

The channel sensing apparatus 306 may compare the remaining signal to an expected noise level in the channel to determine whether there are other users. Or, the channel sensing apparatus 306 may determine a residue signal energy in the remaining signal and compare that to an expected noise level in the channel. If activity in the channel is sensed, signal feature detectors may be used to analyze signal characteristics of the remaining or residue signal, in order to characterize the type of users or systems that are using the channel. Such information relating to the presence and types of other users of the channel may be signaled on the link 322.

Figure 4:
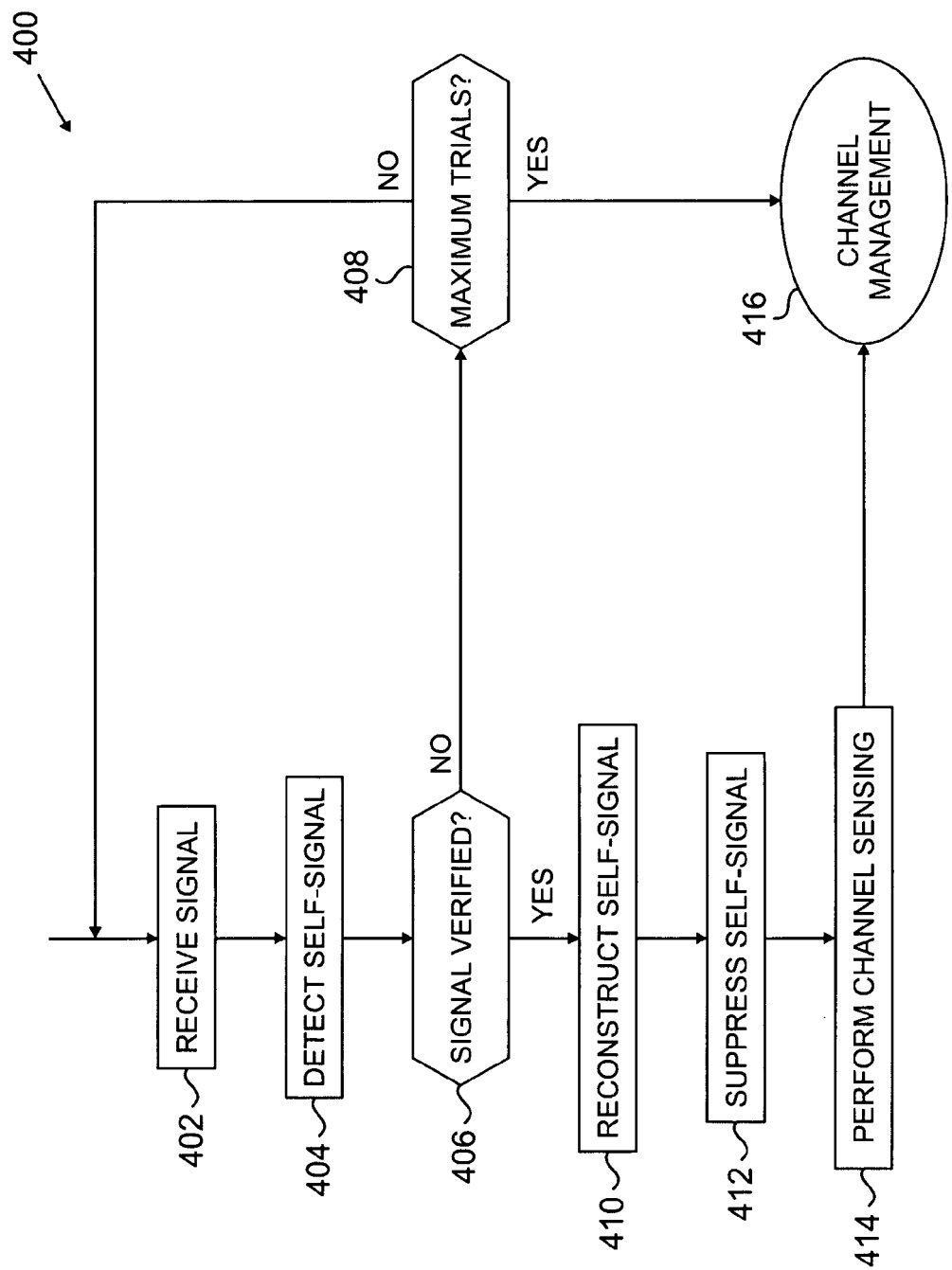
FIG. 4 presents a process for channel sensing according to the present disclosure.

FIG. 4 presents a process 400 for a channel sensing apparatus to follow to perform channel sensing according to the present disclosure. In step 402, the apparatus may receive a signal and attempt to detect a self-signal in step 404. Successful detection and verification of the self-signal may be tested in step 406. If the test fails, then in step 408 a determination may be made of whether a predetermined maximum number of trials has been reached to detect and verify a self-signal. If the maximum number of trials has not been reached, then the process may return to step 402 to receive another signal. If the maximum number of trials has been reached, then the process may terminate and pass on to a channel management process

416 an indication that channel sensing was not performed, or that the channel may be occupied.

If a self-signal is successfully detected and verified in step 406, then in step 410 an original self-signal may be reconstructed from the detected self-signal. Channel characteristics determined by a step of channel estimation may be used in the reconstruction performed in step 410. The reconstructed original self-signal may be used in step 412 to suppress a self-signal component of the signal received in step 402, producing a remaining signal. The remaining signal may be used in step 414 for channel sensing, with resulting information sent to the channel management process 416.

The suppression of the self-signal may be carried out in either the baseband or the analog domain. Accordingly, the channel sensing may be done over the remaining signal either in the baseband or the analog domain.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of channel sensing for use in a first wireless communication device, the method comprising the steps of:
    receiving a signal;
    detecting in the received signal a self-signal transmitted to the first wireless communication device by a second wireless communication device;
    reconstructing from the detected self-signal an original self-signal transmitted by the second wireless communication device;
    removing the reconstructed original self-signal from the received signal to generate a remaining signal; and
    performing channel sensing on the remaining signal.

2. The method of claim 1, wherein the step of detecting a self-signal further comprises verifying an integrity of the detected self-signal.

3. The method of claim 2, wherein, responsive to a failure to verify the integrity of the detected self-signal, the steps of receiving a signal and detecting a self-signal are repeated.

4. The method of claim 3, wherein, responsive to a predetermined number of failures to verify the integrity of the detected self-signal, the method of channel sensing is terminated.

5. The method of claim 3, wherein, prior to repeating the steps of receiving a signal and detecting a self-signal, the first wireless communication device requests the second wireless communication device to retransmit a modified original self-signal.

6. The method of claim 5, wherein the modification to the original self-signal is one of adding error detection information to the original self-signal and changing a power of the original self-signal.

7. The method of claim 1, further comprising the step of performing channel estimation on the received signal, wherein the step of reconstructing an original self-signal further comprises reconstructing an original self-signal according to a result of the channel estimation.

8. The method of claim 7, wherein the received signal comprises a plurality of frames and the step of performing channel estimation utilizes information from a subset of the plurality of frames.

9. The method of claim 1, wherein the step of performing channel sensing further comprises:
    determining a residue signal energy in the remaining signal; and
    comparing the residue signal energy to an expected noise level.

10. The method of claim 1, wherein the step of performing channel sensing further comprises:
    determining a residue signal in the remaining signal; and
    detecting a feature in the residue signal.

11. A wireless communication device, comprising a channel sensing apparatus capable of:
    receiving a signal;
    detecting in said received signal a self-signal transmitted to said wireless communication device by a second wireless communication device;
    reconstructing from said detected self-signal an original self-signal transmitted by said second wireless communication device;
    removing said reconstructed original self-signal from said received signal to generate a remaining signal; and
    performing channel sensing on said remaining signal.

12. The wireless communication device of claim 11, wherein said channel sensing apparatus is further capable of verifying an integrity of said detected self-signal.

13. The wireless communication device of claim 12, wherein said channel sensing apparatus, responsive to a failure to verify said integrity of the detected self-signal, is further capable of receiving a second signal and detecting a self-signal in said second signal.

14. The wireless communication device of claim 13, further comprising a channel management apparatus, wherein said channel sensing apparatus, responsive to a predetermined number of failures to verify said integrity of said detected self-signal, is further capable of sending a signal to said channel management apparatus indicating a failure to perform channel sensing.

15. The wireless communication device of claim 13, wherein said channel sensing apparatus is further capable of requesting said second wireless communication device to retransmit a modified original self-signal.

16. The wireless communication device of claim 15, wherein said modification to said original self-signal is one of adding error detection information to said original self-signal and changing a power of said original self-signal.

17. The wireless communication device of claim 11, wherein said channel sensing apparatus is further capable of:
    performing channel estimation on said received signal; and
    reconstructing said original self-signal according to a result of said channel estimation.

18. The wireless communication device of claim 11, wherein said received signal comprises a plurality of frames and said channel sensing apparatus is further capable of performing channel estimation utilizing information from a subset of said plurality of frames.

19. The wireless communication device of claim 11, wherein said channel sensing apparatus is further capable of:
    determining a residue signal energy in said remaining signal; and
    comparing said residue signal energy to an expected noise level.

20. The wireless communication device of claim 11, wherein said channel sensing apparatus is further capable of:
    determining a residue signal in the remaining signal; and
    detecting a feature in the residue signal.

21. A channel sensing apparatus for use in a wireless communication device, the channel sensing apparatus capable of:
    receiving a signal;
    detecting in said received signal a self-signal transmitted to said wireless communication device by a second wireless communication device;

reconstructing from said detected self-signal an original self-signal transmitted by said second wireless communication device;

removing said reconstructed original self-signal from said received signal to generate a remaining signal; and performing channel sensing on said remaining signal.

22. The channel sensing apparatus device of claim 21, wherein said channel sensing apparatus is further capable of verifying an integrity of said detected self-signal.

23. The channel sensing apparatus of claim 22, wherein said channel sensing apparatus, responsive to a failure to verify said integrity of the detected self-signal, is further capable of receiving a second signal and detecting a self-signal in said second signal.

24. The channel sensing apparatus of claim 23, wherein said channel sensing apparatus, responsive to a predetermined number of failures to verify said integrity of said detected self-signal, is further capable of sending a signal to a channel management apparatus indicating a failure to perform channel sensing.

25. The channel sensing apparatus of claim 23, wherein said channel sensing apparatus is further capable of requesting said second wireless communication device to retransmit a modified original self-signal.

26. The channel sensing apparatus of claim 25, wherein said modification to said original self-signal is one of adding error detection information to said original self-signal and changing a power of said original self-signal.

27. The channel sensing apparatus of claim 21, wherein said channel sensing apparatus is further capable of:
performing channel estimation on said received signal; and
reconstructing said original self-signal according to a result of said channel estimation.

28. The channel sensing apparatus of claim 21, wherein said received signal comprises a plurality of frames and said channel sensing apparatus is further capable of performing channel estimation utilizing information from a subset of said plurality of frames.

29. The channel sensing apparatus of claim 21, wherein said channel sensing apparatus is further capable of:
determining a residue signal energy in said remaining signal; and
comparing said residue signal energy to an expected noise level.

30. The channel sensing apparatus of claim 21, wherein said channel sensing apparatus is further capable of:
determining a residue signal in the remaining signal; and
detecting a feature in the residue signal.

* * * * *